INVENTORS.
Helmut Friedburg
Laszlo Szecsi

*Spencer & Kaye*
BY                ATTORNEYS.

INVENTORS.
Helmut Friedburg
Laszlo Szecsi

United States Patent Office    3,713,035
Patented Jan. 23, 1973

3,713,035
COUPLING SYSTEM WITH ADJUSTABLE COUPLING FACTOR FOR FEEDING HIGH FREQUENCY RESONATOR
Helmut Friedburg and Laszlo Szecsi, Karlsruhe, Germany, assignors to Gesellschaft fur Kernforschung mbH, Karlsruhe, Weberstrasse, Germany
Filed Feb. 23, 1971, Ser. No. 118,126
Claims priority, application Germany, Mar. 7, 1970, P 20 13 585.7
Int. Cl. H01p 5/04, 5/08
U.S. Cl. 333—24 R                                  12 Claims

ABSTRACT OF THE DISCLOSURE

A superconducting coupling system with a coupling head having an adjustable coupling factor and including a feed line which in one embodiment is conically expanded at its coupling end so as to form the coupling head. The feed line is short-circuited with a terminal plate, while the characteristic impedance remains constant. The terminal plate separates the electromagnetic field in the coupling head from that in a resonator to which it is connected. The terminal plate has coupling holes therein which are arranged in pairs and separated from each other by a ridge. The direction of the ridge determines the direction of the conduction current whose magnetic field penetrates through the coupling holes and, as a consequence of the direction of the ridge, is directed so that at least one component of the coupling field coincides with the required direction of the field in the resonator. The arrangement of the coupling holes in pairs has dipole characteristics. Hence, coupling is achieved mainly through a dipole field. The coupling holes can be covered in a predetermined way by means of adjustable covers. The quality factor, Q, of the unloaded resonator is largely independent of the setting of the coupling elements, i.e., the coupling factor. All components in the range of the coupling fields, the adjustable covers included, are superconducting.

BACKGROUND OF THE INVENTION

The invention relates to a coupling system having an adjustable coupling factor for feeding very weakly attenuated high frequency resonators in which the electromagnetic energy is supplied through a feed line connected with the resonator and short-circuited at its coupling end and in which the feed line is firmly connected with the resonator in such a way that the components used to short-circuit the feed line or the wall of the feed line at the same time, at least partly, constitute components of the resonator; a magnetic field accompanies the short-circuit acting in the resonator space; a magnetic coupling field enters into the resonator space through coupling holes provided in these components; and adjustable devices independent of the feed line are provided to cover the coupling holes for adjustment of the coupling factor.

A coupling system with adjustable coupling factor for high frequency resonators is known in which a coupling field enters into the resonator space through coupling holes provided in the wall of the resonator and where adjustable devices are provided for covering the coupling holes. In this case, the coupling factor is adjusted by deformation of a metallic component arranged in front of the coupling hole, such as a wire or a plate, until the required coupling factor is attained. However, an adjustment device of this type is not suited for repeated adjustment of reproducible coupling factors and, hence, for use in a measurement device.

In specific cases, the use of cavity or coaxial resonators produces some advantages. The high frequency currents flowing in the metallic resonator walls cause relatively high dissipations which can be reduced by about 4 to 5 powers of ten by superconducting layers attached to these walls and by cooling of the resonator, e.g., with liquid helium.

Superconducting high frequency resonators can be used in the construction of particle separators and also for measurements, e.g., of the frequency and temperature dependence of the surface resistance of superconducting layers and the power losses encountered in such layers as a function of frequency, temperature, and field strength. The high resonator quality (reciprocal value of attenuation) which can be achieved in such resonators, permits high wall currents and a high electromagnetic field strength to be achieved with low dissipation. However, coupling in resonators of such a high quality is associated with numerous difficulties, since the additional losses occurring in the coupling system must be kept to a minimum.

Either the magnetic or the electric field component may be used for coupling in the energy. Accordingly, a familiar method consists in the application of coupling loops for inductive, and coupling pins for capacitive, coupling. These familiar coupling elements are connected with a coaxial feed line and their longitudinal axis extends into the field space of the resonator so as to be adjustable in such a way that the field of the coupling element and the resonator field are coupled with each other. The coupling factor is determined by the interaction of these fields. However, these normal-conducting coupling elements have relatively high losses which neutralize all advantages of superconducting resonators. Even if the coupling loops or the coupling pins are arranged in a special coupling space connected with the resonator by a bore located in the partition wall between the coupling space and the resonator, these disadvantages continue to exist because, also in this setup, the resonator fields have contact with areas of normal conduction.

An inductive coupling system is known whose coaxial feed line with the coupling loop is set up with its longitudinal axis movable in a spring guiding device; in this case, the magnetic field produced by the coupling loop acts in the resonator to a more or less great depth through a hole in the resonator wall for adjustment of the coupling factor. Due to heat dissipation from the normal-conducting coupling system, there is a close thermal contact between the coupling space and the resonator in such a way that the superconducting state of the resonator is at least partly removed and a technical application is prevented.

High losses of energy are encountered in the known coupling systems particularly if high powers are coupled in; these losses in the coupling devices are due both to the resonator fields and to the high frequency energy fed in and may result in failure of the superconduction. However, even if weak fields are applied, e.g., for the investigation of superconductors, the known coupling systems with normal conduction offer considerable disadvantages, because the losses occurring in them cannot be separated in measurements from the losses occurring in the resonator. Hence, the measured results contain major errors and thus can be interpreted either only approximately or not at all.

Moreover, another major disadvantage of known coupling devices encountered in investigations of the frequency dependence is the fact that the power is split up as a function of frequency, which further falsifies the measured data. This is due to the fact that the fields in the coupling spaces, i.e., in the environment of the coupling loop or the coupling pin, give rise to broadband spurious resonances and, hence, undefined losses.

Another drawback connected with the known coupling device is felt if the coupling factor is to be made adjustable through displacement of the couping device, because geometric changes in the area of the coupling fields alter the loses caused there and thus additionally falsify the measured data.

One further major disadvantage of the known coupling loops and coupling pins is the fact that even if these coupling devices were made of superconducting material, the addition of a coolant would be a prerequisite for adjusting and maintaining superconductivity, which requirement would result in extraordinary difficulties, especially if the components to be cooled would have to be movable. Even if there were a successful solution of the cooling problem, the multitude of other disadvantages of conventional devices would continue to exist.

SUMMARY OF THE INVENTION

Therefore, the present invention is directed to creating a coupling system with a wide range of frequencies for high frequency resonators which works as free from losses as possible, allows continuous adjustment of the coupling factor and almost completely removes all the disadvantages of familiar coupling systems.

According to the present invention this problem is solved in that coupling holes arranged in pairs are arranged so that a ridge remaining between two coupling holes carries a conduction current whose direction is predetermined by the direction of the ridge and whose magnetic field penetrates through the coupling holes as a coupling field and, as a consequence of the direction of the ridge, is so directed that at least one component of the coupling field coincides with the required direction of the field in the resonator. The use of coupling elements for adjustment of the coupling factor which are independent of the feed line makes for a fixed arrangement of the short-circuited feed line to the resonator. This creates the precondition for a simple supply of the coolant and, hence, for making all components located in the area of the coupling fields superconducting.

A particularly simple and reliable design of a coupling system of the type characterized by the invention has the center conductor and the outer conductor of a coaxial high frequency feed line conically expanded at the coupling end, and short-circuited with a terminal plate separating the electromagnetic field in the coupling head from that in the resonator. The characteristic impedance of the line remains constant throughout its length including the conically expanded portion. The terminal plate has closely adjacent coupling holes arranged therein in pairs so that a narrow ridge remaining between two coupling holes carries a conduction current whose direction is predetermined by the direction of the ridge. The magnetic field of the current penetrates through the coupling holes as a coupling field with at least one component of the coupling field coinciding with the required direction of the field in the resonator. The coupling holes can be partly or completely closed by coupling elements for adjustment of the coupling factor, with all components constituting the short-circuit current path between the inner and the outer conductor which are in contact with the coupling field or fields being made of superconducting material or provided with a superconducting surface layer which are directly wetted by liquid helium.

Here, the conical coupling head of the coaxial feed line of the resonator constitutes the design basis of a simple arrangement of helium cooled coupling elements for adjustment of the coupling factor which, just as all the other components in the area of the coupling fields, are completely superconducting.

Another possible coupling device consists mainly of a center conductor and an outer conductor short-circuited with a terminal plate at the end of a coaxial high frequency feed line which terminal plate separates the electromagnetic field in the cylindrical coupling head of the feed line from that in the resonator. The terminal plate carries coupling holes arranged in pairs close to each other. Also this arrangement permits the application of helium cooled coupling elements for adjustment of the coupling factor. However, while the conical coupling head uses preferably coupling elements with the axes parallel to the feed line (coupling plungers), as shown in FIG. 1, it is advantageous with the coaxial feed line with a cylindrical coupling head to use a coupling element with the axis at the level of the terminal plate (coupling slide), as shown in FIG. 6.

The design of the coupling system according to the invention also constitutes a particularly simple way of determining the frequency range of the setup by fixing the characteristic resonance frequency of the coupling holes through a predetermined geometry (shape and distance) in such a way that they are far above the resonance frequencies of the resonator to be supplied (operating frequencies), which makes a wide range of frequencies available for the operating frequencies. Here, it has been shown to be particularly advantageous to design the coupling holes in the terminal plate as bores of circular cross sections and arrange their center points on a circle with a predetermined radius or to make the coupling bores parallel oblong holes whose longitudinal axes are arranged at a predetermined angle relative to the radial direction, preferably 45 degrees.

The design of the arrangement according to the invention is simplified in particular by the fact that the coupling head and the resonator are separated by specific design measures, mainly at the terminal plate level, in such a way that the terminal plate constituted by the resonator wall and the conical expansion of the center conductor of the coaxial feed line constitute one unit and the conical expansion of the outer conductor with the guiding devices and vacuum tight connection of the coupling elements make up another unit. In this way, it becomes possible to provide all those components in the area of the coupling fields which are not made of superconducting material with a superconducting surface layer.

Handling of the device in operation is facilitated also by the fact that the conical coupling head which is made of superconducting material carries as shown in FIG. 7, a cylindrical attachment 210 at its tip end with the end designed for a contact spring 111–112 of the banana pin type for attachment of the normal-conducting center conductor 11 of the coaxial feed line. The attachment which is formed as a plug connection of spring 111–112 within cylinder 210' is arranged outside the area of the coupling fields.

Moreover, it has turned out to be useful to reinforce the contact areas of components detachably connected with each other in the area of the coupling head on their edges abutting on the short-circuit current path by means of a bead and make at least this bead out of superconducting material or provide it with a superconducting layer. Otherwise, the magnetic field in the area of the coupling holes may depend on accidental uncertainties of the contact.

As a result of the design of the coupling system according to the invention it is possible to provide all components in the area of the coupling fields with cooling channels which are connected with the helium pool surrounding the resonator. This creates a basis for the completely superconducting design of the coupling system.

One embodiment of the coupling system according to the invention is shown in the diagram and is described in more detail below.

DESCRIPTION OF THE PREFERRED EMBODIMENTS

Figure 1:
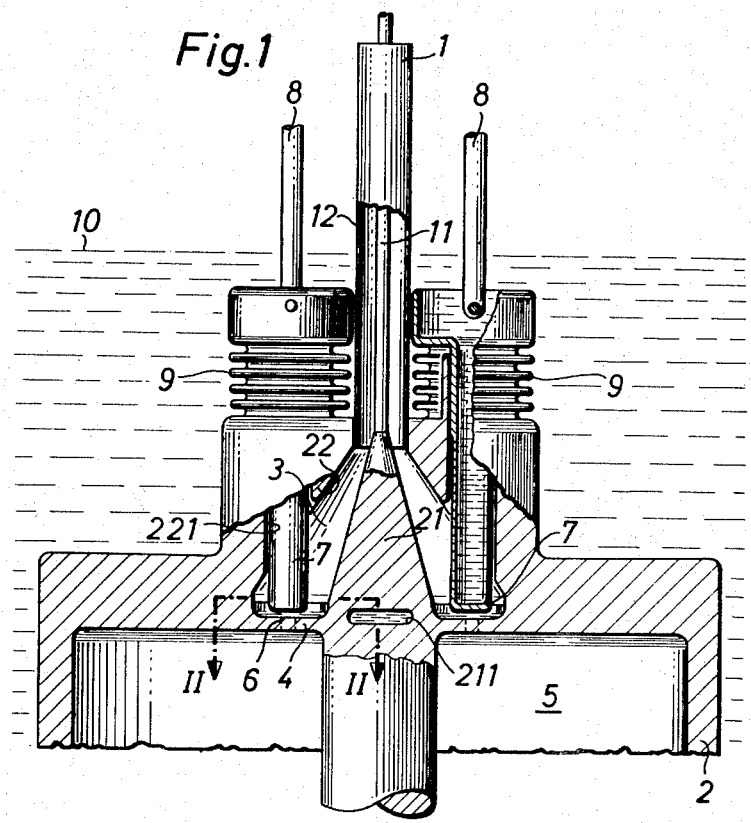
FIG. 1: Partial cross-sectional view in elevation through a coupling system with a conical coupling head.

Referring more specifically to the drawings, high frequency electric energy is supplied to the coaxial resonator 2 through the coaxial feed line 1 (FIG. 1). The center conductor 11 of the feed line is expanded to a cone 21 and the outer conductor 12 to a cone 22 so as to make them jointly form a coupling space 3 having the shape of a hollow cone. This coupling space 3 is limited by a terminal plate 4 at its lower end which plate, in this case, is part of the resonator wall separating coupling space 3 and resonator space 5. On the other side the terminal plate 4 almost completely short-circuits the inner and outer conductors of the feed line.

The terminal plate 4 carries bores 6 arranged in pairs close to each other, the ridge between the bores acting like a coupling coil and the magnetic flux lines being able to close around the ridge and through the coupling holes thus coupling the fields in the coupling space 3 with the fields in the resonator space 5.

For setting the coupling factor, there are coupling plungers 7 for every pair of coupling holes which extend into the coupling space 3 through bores 221 of the cone 22 and can be moved in their axial direction parallel to the feed line 1 by a driving system 8 and, in this process, cover the coupling holes either completely or partly with their plane end. The feed line 1, the coupling space 3, and the resonator space 5 are kept under a high vacuum; therefore, each coupling plunger 7 is attached to the outer wall of the cone 22 through a bellows 9 so as to establish a high-vacuum tight seal. The coupling plungers 7 are designed as hollow cylinders whose inner space is connected with a helium pool 10.

The cone 21 is firmly attached to the terminal plate 4 and is cooled with liquid helium through a central channel 211 located at the level of the terminal plate 4. All components limiting the coupling space 3 or extending into it are made of superconducting material in the area of the coupling fields or carry a superconducting surface layer.

Figure 2:
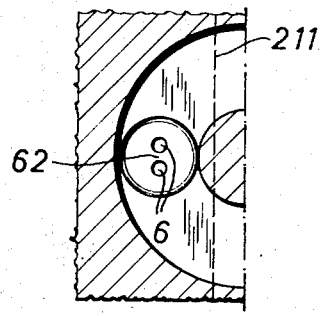
FIG. 2: Section taken along the line II—II of FIG. 1 with circular bores as coupling holes.

FIG. 2 shows the arrangement of the circular bores 6 as coupling holes in the terminal plate 4 separating the coupling space 3 from the resonator space 5. The bores are located on a circle of a predetermined radius. Two closely adjacent bores form a narrow ridge 62.

Figure 3:
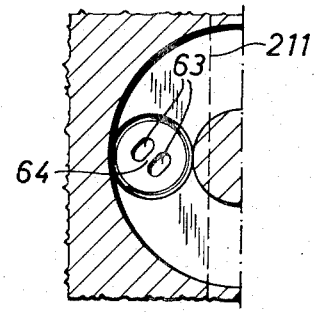
FIG. 3: Section taken along the line II—II of FIG. 1 with oblong holes as holes as coupling holes.

FIG. 3 shows the design of the coupling holes as parallel oblong holes 63 forming a ridge 64 whose longitudinal axis is arranged at an angle of 45 degrees relative to the radial direction.

Figure 4:
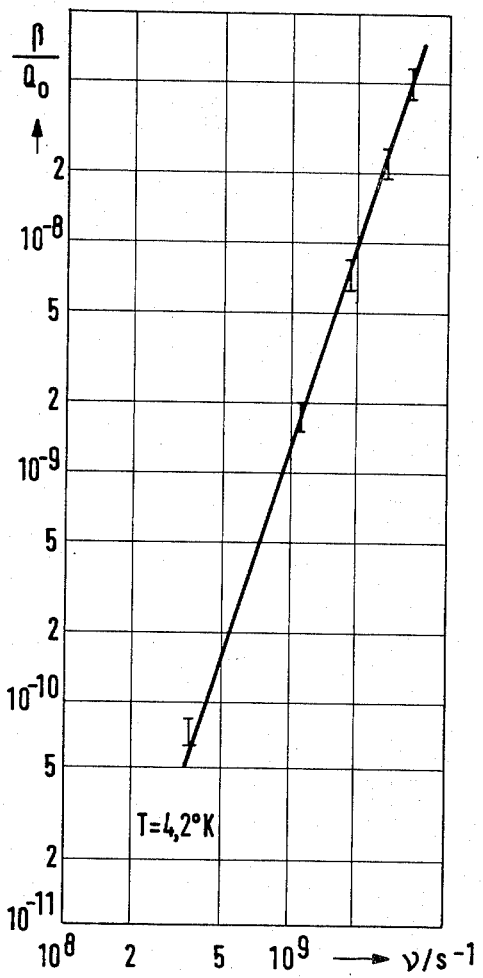
FIG. 4: Is a graph of the ratio of the coupling factor to unloaded resonator quality as a function of frequency of the coupling geometry.

FIG. 4 is a representation of the quotient of the coupling factor $\beta$ and the quality of the unloaded resonator, $Q_o$, as a function of the frequency at constant temperature (4.2° K., i.e., in the superconducting state) and with the position of the coupling plungers unchanged. According to theory, the $\beta/Q_o$ ratio is independent of resonator losses. Within very close limits of error, the result is a plot of $\beta/Q_o \sim \omega^3$. This corresponds to a coupling inductance proportional to the frequency, at the same time indicating that the coupling element must have a relatively simple equivalent circuit and that potential disturbing resonances, e.g., of the coupling plungers, are narrow enough in bandwidth to be unnoticed in the range of measurement frequencies.

Figure 5:
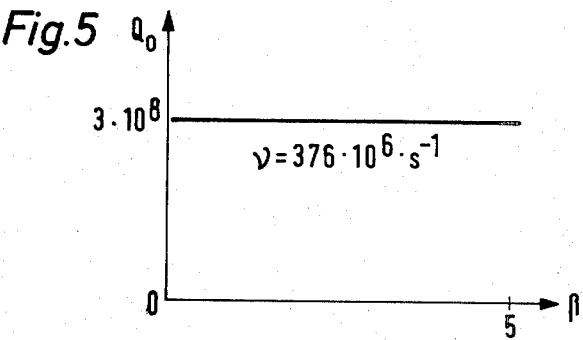
FIG. 5: Is a graph of the unloaded resonator quality as a function of the coupling factor.
Figure 6:
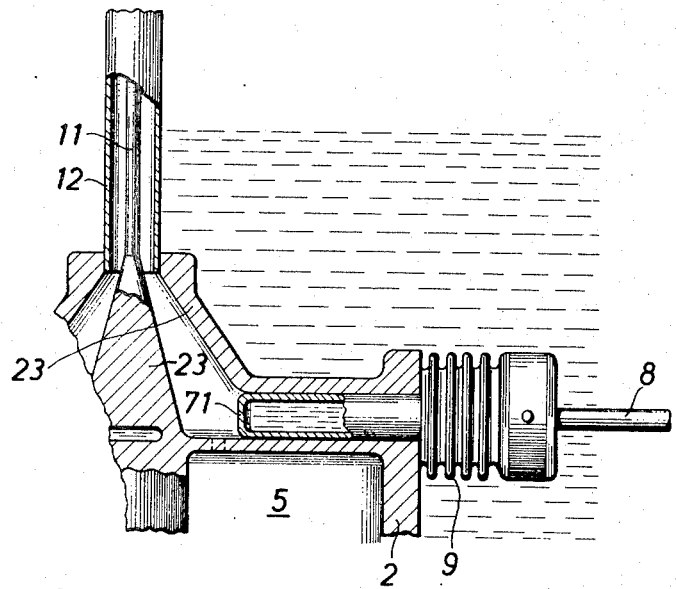
FIG. 6: Is a partial cross-sectional view in elevation through a portion of a coupling system when the coupling elements are formed as coupling slides.
Figure 7:
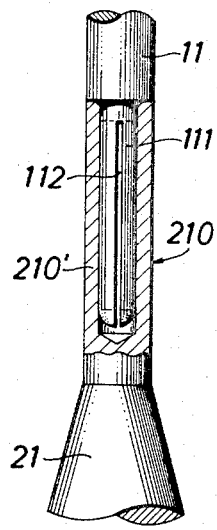
FIG. 7: Is a partial cross-sectional view in elevation of a cylindrical attachment for the coaxial feed line.

In FIG. 5, the quality $Q_o$ of the unloaded resonator is shown as a function of the coupling factor $\beta$. Measurements in the $0.01 \leq \beta \leq 5$ range resulted in a constant value of $Q_o$ showing that in this range the resonator losses do not include a measurement contribution due to the settling of the coupling plungers.

The special advantages of the coupling system according to the invention are the possibility, for the first time, of making all components in the area of the coupling fields completely superconducting so that, a suitable geometry provided, any cavity or coaxial resonator of high quality can be coupled in almost without any loss over a wide range of frequencies and, at the same time, the coupling factor is continuously adjustable.

The quality of the unloaded resonator, $Q_o$, is largely independent of the setting of the coupling elements, i.e., of the coupling factor $\beta$. The arrangement in pairs of the coupling holes has dipole characteristics; thus, coupling is effected mainly by a dipole field.

The simple design also allows fast assembly, guarantees high-vacuum tightness and reliable cooling of all superconducting parts.

These advantageous characteristics of the cooling system permit very accurate measurements to be made, e.g. in the investigation of superconductors with respect to the dependence on temperature and frequency of the surface resistance.

What we claim is:

1. A coupling system with adjustable coupling factor for feeding a very weakly attenuated high frequency resonator, comprising: a feed line firmly connected to the resonator for supplying electromagnetic energy; means short-circuiting said feed line at its end adjacent the reasonator, said means constituting a part of the resonator and including a plurality of pairs of coupling holes and a ridge between the holes of each said pair; and a plurality of adjustable devices which are independent of said feed line and are provided to each cover one of said pairs of coupling holes for adjustment of the coupling factor, each said ridge carrying a short-circuit conduction current from said feed line whose direction is predetermined by the direction of the ridge and whose magnetic field penetrates through the coupling holes into the resonator space and acts as a coupling field and, as a consequence of the direction of the ridge, the coupling field is so directed that at least one component thereof coincides with the required direction of the field in the resonator.

2. A coupling system as defined in claim 1, wherein said feed line is a coaxial high frequency feed line having a center conductor and an outer conductor, said center conductor and said outer conductor are conically expanded, while the characteristic impedance remains constant, and form with said short-circuiting means a coupling head, and wherein said short-circuiting means is formed as a terminal plate which short-circuits said center and outer conductors, and which separates the electromagnetic field in the coupling head from that in the resonator.

3. A coupling system as defined in claim 1, further comprising a helium pool, wherein said feed line includes a center conductor and an outer conductor, with said center conductor and said outer conductor forming with said short-circuiting means a coupling head, and wherein all components of the coupling head constituting the short-circuit current path between said inner and said outer conductors which contact the coupling field are made of superconducting material and are directly wetted with liquid helium.

4. A coupling system as defined in claim 1, further comprising a helium pool, wherein said feed line includes a center conductor and an outer conductor, with said center conductor and said outer conductor forming with said short-circuiting means a coupling head, and wherein all components of the coupling head constituting the short-circuit current path between said inner and said outer conductors which contact the coupling field include a superconducting surface layer and are directly wetted with liquid helium.

5. A coupling system as defined in claim 1, further comprising a helium pool, and a bellows for each said adjustable device, wherein said short-circuiting means is formed as a terminal plate, said feed line is a coaxial feed line, said feed line and said terminal plate form a coupling head in which part of said feed line serves as an outside wall of said coupling head, and said adjustable covering devices are coupling plungers made of superconducting material which are designed as helium-filled hollow cylinders connected with said helium pool, with said coupling plungers each having a longitudinal axis extending parallel to the axis of said coaxial feed line and said coupling head and being closed at the end thereof facing towards its respective coupling holes, and with said ends being plane and arranged parallel to the plane of said terminal plate, and wherein said coupling plungers are attached to said outside wall of said coupling head by said hollows so as to establish between said plungers and said wall a high-vacuum tight seal and so that said plungers are displacable along their longitudinal axes.

6. A coupling system as defined in claim 1, further comprising a helium pool, and a bellows for each said adjustable device, wherein said short-circuiting means is formed as a terminal plate, said feed line includes an outer conductor and a center conductor, and said adjustable covering devices are coupling slides made of superconducting material which are designed as helium-filled hollow cylinders connected with said helium pool, with said coupling slides each having at least one flattened side and a longitudinal axis which is arranged parallel to the plane of said terminal plate, and with each said flattened side being positioned above its respective coupling holes, and wherein each of said coupling slides is connected to the outer conductor of said feed line by one of said bellows so as to establish between said slides and said outer conductor a high-vacuum tight seal and so that said slides are displaceable along their longitudinal axes.

7. A coupling system as defined in claim 1, wherein said short-circuiting means is formed as a terminal plate, and wherein said coupling holes in said terminal plate are designed as bores of a circular cross section, the center points of which are located on a circle of a predetermined radius.

8. A coupling system as defined in claim 1, wherein said short-circuiting means is formed as a terminal plate, and wherein said coupling holes in said terminal plate are designed as oblong parallel holes whose longitudinal axes are arranged at a predetermined angle relative to the radial direction of the resonator.

9. A coupling system as defined in claim 8, wherein said angle is 45 degrees.

10. A coupling system as defined in claim 1, further comprising means for guiding each of said adjustable covering device and means for forming a vacuum-tight connection for said adjustable covering devices, and wherein said short-circuiting means is formed as a terminal plate, and said feed line is a coaxial feed line having a center conductor and an outer conductor, with said center conductor and said outer conductor being conically expanded and forming with said terminal plate a coupling head, and wherein said coupling head and the resonator are separated into specific units, at the level of said terminal plate, in such a way that said terminal plate and said conically expanded center conductor constitute one unit of the system while said conically expanded outer conductor, said guiding means for said adjustable covering devices and said vacuum-tight connection means for said adjustable covering devices constitute another unit of the system.

11. A coupling system as defined in claim 1, wherein said short-circuiting means is formed as a terminal plate, and said feed line is a coaxial feed line having a center conductor and an outer conductor, with said center conductor and said outer conductor being conically and forming with said terminal plate a conical coupling head made of superconducting material, and wherein said coupling head carries at the tip thereof a cylindrical attachment with an end designed as a contact spring for attachment of said normal-conducting center conductor, said attachment being formed as a plug connection which is located outside the area of the coupling fields.

12. A coupling system as defined in claim 1, further comprising a helium pool and cooling channels which are provided for said short-circuiting means in the area of the coupled fields, said cooling channels being connected with said helium pool and filled with helium therefrom.

References Cited

UNITED STATES PATENTS

| 2,901,660 | 8/1959 | Pearce et al. | 333—83 R |
| 3,564,546 | 2/1971 | Barney et al. | 333—83 R |
| 2,626,316 | 1/1953 | Gibson | 333—83 R |

FOREIGN PATENTS

| 1,054,513 | 4/1959 | Germany | 333—83 R |

PAUL L. GENSLER, Primary Examiner

U.S. Cl. X.R.

315—5.21, 5.46; 333—83 R, 99 S